INVENTORS.
EDWARD L. RUCKS
HAROLD R. GRANT

BY
ATTORNEY.

United States Patent Office 3,189,054
Patented June 15, 1965

3,189,054
LAMINATE STRUCTURE OF ALTERNATE LAYERS
OF METAL AND GLASS FIBER TAPES
Edward L. Rucks, Pasadena, and Harold R. Grant, Rancho Cordova, Calif., assignors to Aerojet-General Corporation, Azusa, Calif., a corporation of Ohio
Filed June 23, 1961, Ser. No. 124,273
14 Claims. (Cl. 138—143)

This application is a continuation-in-part of U.S. application Serial No. 635,545, filed January 22, 1957, now abandoned.

This invention relates to lightweight, high strength members and in particular to nonporous members having predetermined directional properties, great strength in relation to weight, and the ability to withstand rough handling, lateral and compressive forces.

Various fabricated lightweight members for such uses as pressure vessels, tanks, pipes, casings for rocket motors, and in general, pressure containing or excluding articles have received intensive study.

It has been proposed to form such members by arranging to the desired contour, tapes of metal or of thermoplastic impregnated fabrics. Glass fibers commercially known as "Fiberglas" have been used. The arranged layers have been bonded together by uncured resins or adhesives, such as epoxy resins, and the articles produced cured by heat and pressure.

While such members have proven valuable for various specific applications, they are not suitable for members where it is necessary to provide for maximum strength-to-weight ratio and heat dissipation as well as structural rigidity. This type of structure is required, for example, in casings for rocket motors where intense heat, acceleration loads, and vibration are encountered. Submerged or fluid pressure containing vessels often require maximum strength-to-weight ratios which can be obtained only by tailoring the directional properties of the vessel so the vessel is not overdesigned for the loads which will be applied to it. Prior structures have not possessed these desirable characteristics.

It is therefore an object of this invention to overcome the above-mentioned disadvantages.

It is another object of the invention to provide bodies having an improved resistance to deformation, and higher heat capacity than laminar constructions hitherto produced.

It is a further object of the invention to provide laminar bodies utilizing plies of material selected for particular properties contributing to the novel directional characteristics of the structure.

With these and other objects in view, as will appear hereinafter from the specification and drawings of this application, the laminates of this invention comprise alternate layers of thin metal and monodirectional glass fibers bonded with a thermosetting resin contoured to any desired configuration. The materials are preferably arranged as overlying continuous lengths of tape or filaments, successive layers being overlapped. The metal and glass fibers are arranged and proportioned so as to just support the predetermined forces which will be applied to the laminate parallel to its axis. The resin is cured by appropriate means.

In the drawings:

FIG. 1 is a fragmentary plan view of a tubular member during manufacture while still on the forming mandrel. The member shown is formed of three layers of metal and two layers of glass fibers, the material being in the form of superposed tapes and filaments of equal length. Certain portions of the metal tape are cut away to show the underlying glass fiber;

Figure 1:
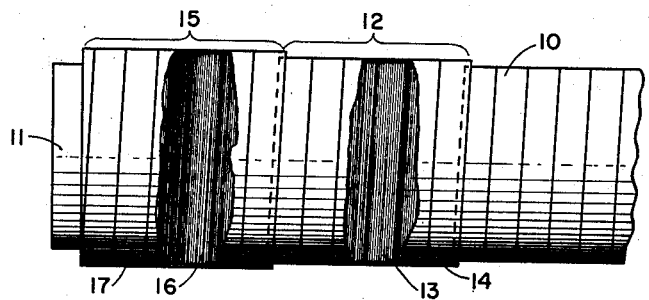
Figure 2:
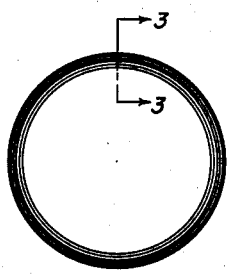
FIG. 2 is an end view of the tubular member shown in FIG. 1.
Figure 3:
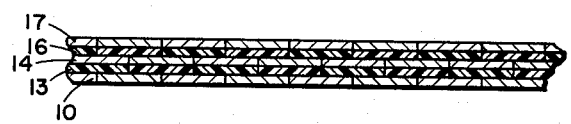
FIG. 3 is a section on the line 3—3 in FIG. 2 drawn on a larger scale.
Figure 4:
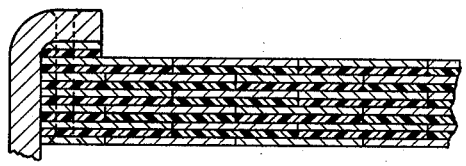
FIG. 4 is a fragmentary sectional view of a tubular member having five plies, the joining lines of successive pairs of plies being staggered and a metal cap being indicated as riveted over one end of the tubular member; and, FIG. 5 is a graph showing how aluminum tapes, of different thickness, and glass fiber tape, containing unidirectional filaments, elongate under stress.

Referring now to the drawings, the numeral 10 indicates a tape of thin metal, preferably aluminum alloy, having, for example, a width of approximately two inches and a thickness of .016 inch. The tape is arranged on a mandrel in a helix of small lead angle, for example, of about 3°. The lead angle is determined by the strip width used and the diameter of the mandrel 11. The metal tape forms the inner surface of the cylindrical member shown in FIG. 1. Over the innermost layer 10, is a layer 12, comprising a tape 13 of unidirectional glass fiber held together by a thermosetting resin. Tape 13 can be, for example, approximately .01 inch in thickness. A second layer of metal tape 14 is arranged over layer 12, and in the referred embodiment displaced so that the joining line with the first layer 10 is broken.

Layer 15 comprises a tape 16 of unidirectional glass fibers laid on the metal strip 14, and metal tape 17 arranged over layer 12. The completed laminate has a five ply construction of three metal strips and two tapes of unidirectional glass fibers in a thermosetting binder. The layers of tape are arranged under uniform tension on the mandrel and form a tubular member.

The thermosetting resin impregnated tape is cured, for example, by subjecting the article to heat for a sufficient length of time to cure the resin. The resin first softens and adheres to the metal strips above and below it, and then cures to constitute a rigid structure with the metal strips firmly bonded together with the transverse glass fibers. Thermosetting resins which are curable by other chemical or physical means, such as radiation or curing catalysts, can be used if desired.

In a specific tubular member comprising five plies, the uncured article was heated to 320° for a period of one-half hour, whereby complete cure was obtained.

In the completed tubular article, the glass fiber material takes the hoop stresses, i.e., the stresses which are applied along an axis parallel to the fibers. Glass fibers are, of course, much stronger for resisting such stresses than, for example, aluminum would be if the cylindrical article were built completely of aluminum strip. The glass fiber tape has a tensile strength of 117,000 lbs. per square inch, while aluminum tape has a tensile strength of 78,000 lbs. per square inch. Axial stress is taken wholly by the metal through the shear of the thermosetting resin which transfers the axial stress into the next adjacent metal layer and back to the next turn of the metal tape. For example, an aluminum-glass fiber tubular article of our invention having the same inside diameter, length, and strength, as compared to one made entirely of steel tape, has a strength-to-weight ratio in tension of 1,120,000, as compared to 795,000 for the steel article. This is so because of the lesser weight of aluminum and epoxy impregnated glass fibers. The structure of our invention possesses a higher heat capacity, greater stiffness and greater resistance to deformation than the described steel structure, because of its greater wall thickness. The greater volume of the tubular member as compared to one of equal strength constructed of steel tape alone, is due to the lesser specific densities of our materials. The specific density of aluminum is about .100 lb./in.$^3$ and that of glass fiber tape is about .068 lb./in.³. The combined aluminum-glass fiber tubular article, in the ratios described, has a density of 0.085 lb./in.³.

Laminate articles of this invention can be of any shape. For example, a prolate spheroid laminate article which is to be used either as a pressure-containing vessel or to be submerged in a pressurized fluid is within the scope of this invention. Other shapes which are within the scope of this invention include but are not limited to oblate spheroids, cones, etc.

In various applications, it is often desirable to vary the amount of glass fiber or metal applied parallel to a given axis. For example, in a prolate spheroid having glass fibers arranged in the hoop direction around metal segments arranged in the longitudinal direction, the total strength requirements in the hoop direction vary with the diameter of the prolate spheroid. The amount of glass fiber can be varied as the strength requirements vary with varying diameter. The metal thickness can also be varied to meet the varying strength requirements.

Once the forces along the various axes in a laminate article or a laminate section have been determined, it is possible, by applying the principles of this invention and the known physical properties of the materials, to determine the amounts of metal and glass fiber which are necessary to resist the predetermined axial forces for any shape of composite of materials.

Preferably, to obtain the optimum weight-to-strength ratios, substantially all of the forces applied parallel to at least one axis of a laminate section of this invention will be supported by the metal. Forces applied parallel to at least one other axis of the laminate section will be taken by unidirectional glass fibers arranged substantially parallel to the axis. The glass fibers can support substantially all of the forces applied parallel to them or part of the forces can be supported by the metal, depending upon the arrangement of the metal.

In a typical application, where it is desired to produce a laminate article having twice as much strength in a direction parallel to a first axis as it has in a direction parallel to a second axis, the second axis being at right angles to the first axis, maximum results are secured by using aluminum tape in the proportion of eight parts by volume to five parts by volume of the glass fiber, exclusive of the resin. The unidirectional glass fibers are all arranged parallel to the first axis. In this application, substantially all of the stress in a direction along the first axis is taken by the glass fibers, while that in a direction along the second axis is taken by the aluminum. It is pointed out that while aluminum tapes and unidirectional glass fiber tape bound by an epoxy resin filler and adhesive have been disclosed, and the conditions for maximum results will be later discussed, other metals than aluminum and other combined binders and adhesives than epoxy resin can be used in producing members of maximum strength-to-weight ratio for various particular uses. Where a tubular article is produced, and the second axis is the longitudinal axis, the article is well adapted for use as a rocket combustion chamber for which use maximum strength-to-weight, ability to withstand rough handling and high acceleration, intense vibration forces and high temperatures, are essential.

In a laminate article of this invention, the glass fibers are aligned parallel to one axis of a laminate so as to support the forces applied to the laminate in a direction parallel to the glass fibers. Both tensile and compressive forces can be supported by glass fibers. In order to support compressive forces, the glass fibers must be held against bending. The same resin which holds the laminate together will also serve to hold the glass fibers against bending under compressive loads.

In order to secure the advantageous features of our invention for whatever use the laminate article is intended, the ratio of metal strip to glass fibers should be selected so as to withstand the axial stress to which the article is to be subjected. By selection of the proper ratio of metal to glass fibers, it is possible to tailor the strength of the final product along any axis to match the loads or forces to be imposed upon it. Proper selection also assures that the final product will be no stronger in any direction than is necessary to support the loads imposed upon it. Since an article tailor-made to fit the specific loads applied to it is not overdesigned in any respect, such an article will have the optimum strength-to-weight ratio.

A laminate article of this invention can normally be considered to have only two axes, at right angles to one another, with the glass fibers arranged parallel to one of the axes. It is apparent, however, that a laminate article of this invention can be considered to have more than two axes at any angle to one another, or if the laminate article is considered to have only two axes, these two axes need not be at right angles to one another. In a laminate article containing compound shapes, it may be convenient for description purposes to consider the laminate article as containing several laminate sections having different sets of axes.

Glass fibers can be arranged along any axis or along several axes in a given laminate article to resist loads wherever they are the greatest. Obviously, the principles of our invention are particularly applicable when the loads on a laminate article are to be unsymmetrically distributed along the various axes of the article.

Figure 5:
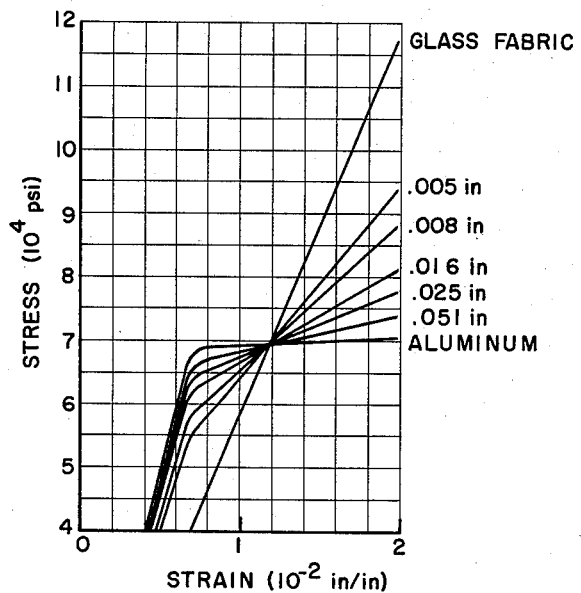

In selecting the materials to secure full advantage of the construction of our invention, the modulus of elasticity of both the metal and the glass fiber material should be as nearly as possible the same, or one of the materials must be capable of plastically yielding until the other is strained adequately to resist the applied load. The combination of aluminum and glass fiber is readily adapted to these conditions, as will be evident from the graph shown in FIG. 5. From FIG. 5, it will be seen that aluminum tape of various thickness will deform but share the stress with the glass fiber tape of a thickness of .01 at a stress in the metal aluminum of about 69,500 lbs., after which point the full strength of both the aluminum and glass fiber tape is brought into action.

The articles produced by the method of our invention can be machined by usual shop practices, excluding welding. For instance, an exhaust nozzle and a head cap can be secured by riveting to the ends of a rocket chamber. Thickened end portions can be provided on lengths of pipe which can be screw threaded to receive pipe unions. Other known joining procedures can be utilized.

Examples of other suitable metals are copper, pure nickel, many stainless steel alloys of high nickel-chrome content, brass, bronze, magnesium for certain purposes and many others.

Adhesive and bonding agents suitable for use include epoxy base materials, such as "Epon VI" and "Epon VIII," manufactured by Shell Chemical Corporation, "Bondmaster M611" made by Rubber & Asbestos Corporation, "Cycleweld C14" of the Chrysler Corporation, and others. Suitable phenolic-base materials are "Metal bond 4021" and "m143c" made by Narmo Resins and Coatings, "EC–1245" of the Minnesota Mining and Manufacturing Co., and others. Other suitable thermosetting resins include polyurethanes, e.g., that polyurethane produced by reacting toluene diisocyanate, neopentyl glycol, and adipic acid; unsaturated polyesters cured with vinyl compounds; formaldehyde base resins such as ureaformaldehyde; etc.

Combinations of adhesive and bonding material with which the monodirectional glass fiber material is impregnated may also be used. For instance, a phenolic-base adhesive may be used as a primer and an epoxy-base adhesive as a final bonding agent.

In a tubular article constructed according to the principles of this invention, it is often desirable to increase the quantity of metal or glass fiber near the middle of the tubular article to resist bending forces.

According to this invention, materials can be prestressed during manufacture and the stress set in the laminate, so that the full strength of the composite is brought into use immediately upon the application of a load without further yielding. Alternatively, the materials can be left unstressed during manufacture of the laminate so that they yield considerably under an applied load before they exhibit significant resistance. The glass fibers can be prestressed in tension and the metal can be prestressed in either tension or compression.

While preferred embodiments of our invention have been specifically described and illustrated, it is to be understood that various changes may be made therein by those skilled in the art without departing from the scope of the invention as defined by the appended claims.

We claim:

1. A laminate section for resisting predetermined axially unsymmetrical forces comprising alternate layers of metal and thermoset resin impregnated unidirectional glass fibers; said laminate section having at least a first axis and a second axis; said unidirectional glass fibers being arranged parallel to at least said first axis so as to support said predetermined forces applied to said laminate section parallel to said first axis; and said metal being substantially the only support for said predetermined forces applied to said laminate section parallel to said second axis.

2. The laminate section of claim 1 wherein said glass fibers and said metal are present in quantities just sufficient to support said predetermined forces.

3. The laminate structure of claim 1 wherein said metal is aluminum.

4. The laminate structure of claim 1 wherein said metal is steel.

5. The laminate structure of claim 1 wherein said metal is copper.

6. A laminate section as set forth in claim 1 wherein said thermoset resin impregnated unidirectional glass fibers are in the form of a continuous tape.

7. A laminate section as set forth in claim 1 wherein said layers of metal and glass fibers are prestressed.

8. A tubular laminate article comprising alternate layers of metal and thermoset resin impregnated unidirectional glass fibers; said unidirectional glass fibers being arranged in the hoop direction so as to support predetermined forces applied to said tubular laminate article in the hoop direction; said metal being substantially the only support for predetermined forces applied to said tubular laminate article in the longitudinal direction; and said metal and said glass fibers being present in quantities just sufficient to support said predetermined forces.

9. The tubular laminate article of claim 8 wherein said metal is aluminum.

10. The tubular laminate article of claim 9 wherein said aluminum is present in the proportion of eight parts by volume to five parts by volume of the glass fiber.

11. A tubular laminate article as set forth in claim 8 wherein said thermoset resin impregnated unidirectional glass fibers are in the form of a continuous tape.

12. A tubular laminate article as set forth in claim 8 wherein said layers of metal and glass fibers are prestressed.

13. A tubular laminate article comprising alternate layers of metal and thermoset resin impregnated unidirectional glass fibers; said layers of metal and unidirectional glass fibers being arranged in staggered relationship with the resin impregnated in said unidirectional glass fibers bonding said layers together; said unidirectional glass fibers being arranged in the hoop direction so as to support forces applied to said tubular laminate article in the hoop direction; and said metal being substantially the only support for forces applied to said tubular laminate article in the longitudinal direction.

14. A tubular laminate article comprising alternate layers of metal and thermoset resin impregnated unidirectional glass fibers; successive pairs of layers of metal and undirectional glass fibers being arranged in staggered relationship with the resin impregnated in said unidirectional glass fibers bonding said layers together; said unidirectional glass fibers being arranged in the hoop direction so as to support forces applied to said tubular laminate article in the hoop direction; and said metal being substantially the only support for forces applied to said tubular laminate article in the longitudinal direction.

References Cited by the Examiner

UNITED STATES PATENTS

| | | | |
|---|---|---|---|
| 2,835,107 | 5/58 | Ward. | |
| 2,858,854 | 11/58 | Daggett | 138—124 |
| 2,884,010 | 4/59 | Fischer | 138—144 |
| 2,954,803 | 10/60 | Barnes et al. | 138—143 |

LEWIS J. LENNY, *Primary Examiner.*

SAMUEL FEINBERG, EDWARD V. BENHAM,
*Examiners.*